United States Patent [19]

Iwatsuka et al.

[11] Patent Number: 4,566,843
[45] Date of Patent: Jan. 28, 1986

[54] MULTIARTICULATED MANIPULATOR

[75] Inventors: Nobuyoshi Iwatsuka; Fumio Tomizawa; Chikara Sato, all of Hitachi; Norihiko Ozaki, Mito; Yoshiaki Ichikawa, Hitachi; Kenichiro Sadakane, Katsuta, all of Japan

[73] Assignee: Hitachi, Ltd., Tokyo, Japan

[21] Appl. No.: 534,078

[22] Filed: Sep. 20, 1983

[30] Foreign Application Priority Data

Sep. 22, 1982 [JP] Japan .................................. 57-163901

[51] Int. Cl.⁴ .............................................. B66C 23/00
[52] U.S. Cl. ..................................... 414/680; 414/735; 414/744 R; 901/21; 901/44
[58] Field of Search ........................ 901/28, 20, 41, 21, 901/19, 14, 1, 44; 414/7, 735, 749, 744 R, 680; 3/1, 3; 356/372, 388

[56] References Cited

U.S. PATENT DOCUMENTS 3,497,083 2/1970 Anderson et al. .................. 901/28 X
3,631,737 1/1972 Wells .................................. 901/21 X
3,918,814 11/1975 Weiser ............................... 356/156
4,302,146 11/1981 Finlayson et al. ............... 414/744 R Primary Examiner—Robert J. Spar
Assistant Examiner—Donald W. Underwood
Attorney, Agent, or Firm—Antonelli, Terry & Wands

[57] ABSTRACT

A multiarticulated manipulator including a multijoint connecting mechanism having a plurality of arms, each arm having a joint capable of being bent in one plane and all the arms being connected with one another in positions spaced apart from one another by circumferential extent of 90 degrees. A plurality of wires are provided, each wire being connected to one of the arms and all the wires being supported and guided by wire guides and driven by a drive. The multiarticulated manipulator incorporated in a movable type remoted-controlled visual monitor system further includes a lens fixed to a forward end of the multijoint connecting mechanism, a fiberscope connected to the lens, and a movable member having the drive mounted therein and supporting the multijoint connecting mechanism, and a camera mounted in the movable member and connected to the lens through the fiberscope.

5 Claims, 9 Drawing Figures

MULTIARTICULATED MANIPULATOR

BACKGROUND OF THE INVENTION

This invention relates to multi-articulated manipulators, and more particularly it is concerned with a multiarticulated manipulator having particular utility in use with a movable inspection apparatus.

One type of multiarticulated manipulator is disclosed in Japanese patent application No. 74264/81. This type includes a soft mechanism having no segments whose forward end can be moved and bent in three dimensions by manipulating four wires attached to a forward end of a conical coil spring. It is impossible, however, to control the movement of other parts than the forward end of this mechanism, so that it is impossible to bend it in the form of a letter S.

SUMMARY OF THE INVENTION

This invention has as its object the provision of a multiarticulated manipulator capable of being bent in three dimensions.

According to the invention, there is provided a multiarticulated manipulator comprising a multijoint connecting mechanism including a plurality of arms, each arm having a joint capable of being bent in one plane and all the arms being connected with one another in positions displaced from one another by an arbitrarily selected angle, a multiplicity of wires each provided to one of the arms, wire-guide means for supporting and guiding the wires, and drive unit means for driving each of the wires.

Additional and other objects, features and advantages of the invention will become apparent from the description set forth hereinafter when considered in conjunction with the accompanying drawings.

DETAILED DESCRIPTION OF THE PREFERRED EMBODIMENT

A preferred embodiment of the multiarticulate manipulator in conformity with the invention will be described in detail by referring to FIGS. 1, 2, 3A and 3B. As shown, the multiarticulated manipulator comprises a multiarticulated mechanism of seven degrees of freedom comprising eight cylindrical arms 1A-1H, and seven joints 2A-2G connecting the arms 1A-1H together and holding same in position, and secured to a fixed portion 5 as by bolts. More specifically, the arm section 1H is secured to the fixed portion 5 and the arms 1G, 1F, 1E, 1D, 1C, 1B and 1A are connected together in the indicated order from the arm 1H toward the forward end of the multiarticulated manipulator. The adjacent joints or the joints 2A and 2B, for example, are arranged in positions displaced from each other by a circumferential extent of 90 degrees. More specifically, the arms 1B-1H are each formed at one end thereof with a pair of projections 20A and 20B which represent extensions of side walls of the arm sections. The joints 2A-2G are each connected at opposite ends thereof to the projections 20A and 20B of the arms 1B-1H. The arms 1A-1H are each pivotably connected to one of the joints 2A-2G connected to the adjacent arms 1B-1H at ends thereof which are not formed with the projections 20A and 20B. The arms 1A-1G are each inserted between the projections 20A and 20B of the adjacent arms. To this end, the projections 20A and 20B of arms 1A, 1C, 1E and 1G are displaced from those of the arms 1B, 1D, 1F and 1H respectively, and thus the joints 2A, 2C, 2E and 2G are displaced from the joints 2B, 2D, 2F and 2H respectively by a circumferential extent of 90 degrees. By this arrangement, the arms 1A, 1C, 1E and 1G move in swinging movement upwardly and downwardly and the arms 1B, 1D, 1F and 1H move in swinging movement leftwardly and rightwardly in FIG. 1.

Figure 2:
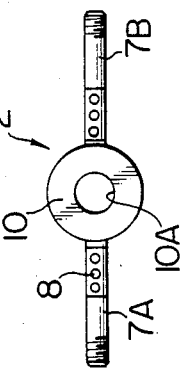
FIG. 2 is a detailed view of one of the joints shown in FIG. 1.

FIG. 2 shows in detail the construction of one of the joints 2A-2G. As shown, the joint 2 comprises a pair of rods 7A and 7B, and a ring 10 formed with an opening 10A. The pair of rods 7 are connected to a side wall of the ring 10 in diametrically opposed positions, and the rods 7A and 7B are each formed with a multiplicity of guide holes 8 for guiding wires for moving the arms in swinging movement. Each joint 2 is connected to the respective arm in such a manner that the ring 10 is located within the arm and the rods 7A and 7B extend through the side wall of the arm. The rods 7A and 7B are connected at their forward ends to the projections 20A and 20B of the adjacent arm section.

Figure 1:
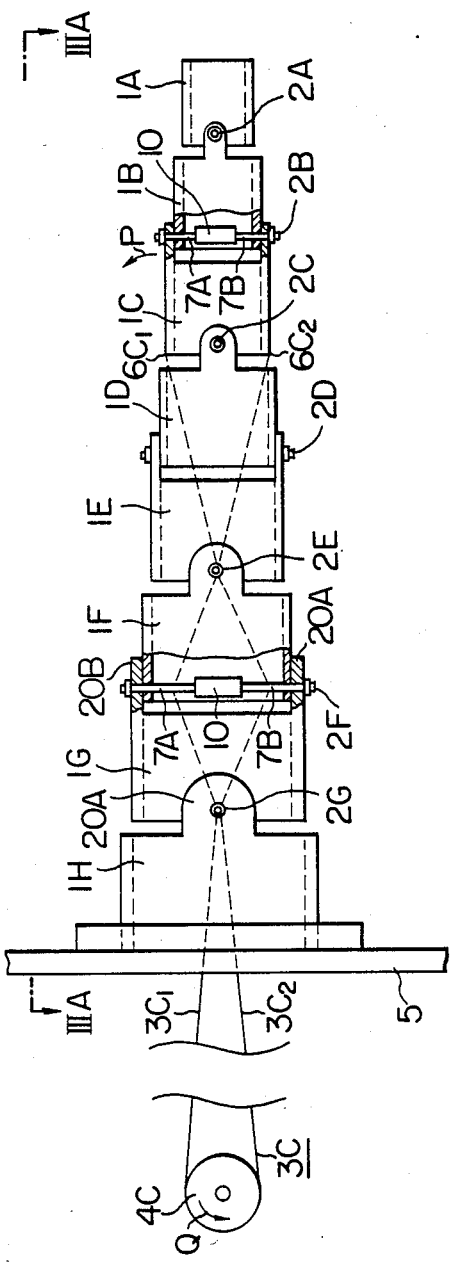
FIG. 1 is a side view of the multiarticulated manipulator comprising one embodiment of the invention.
Figure 3A:
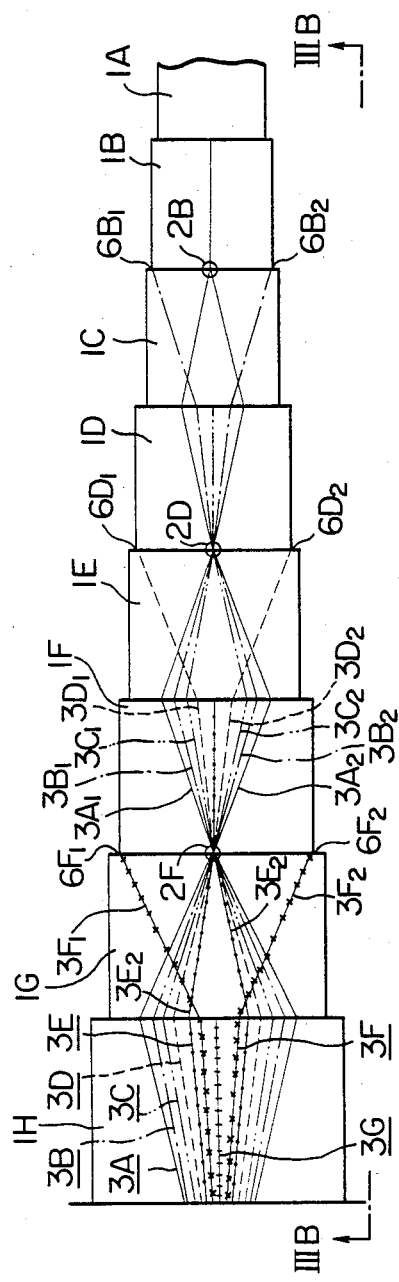
FIGS. 3A and 3B are views as seen in the direction of arrows IIIA—IIIA and IIIB—IIIB respectively in FIG. 1 and FIG. 3A, in explanation of the manner in which the wires of the multiarticulated manipulator are connected to the arms.
Figure 3B:
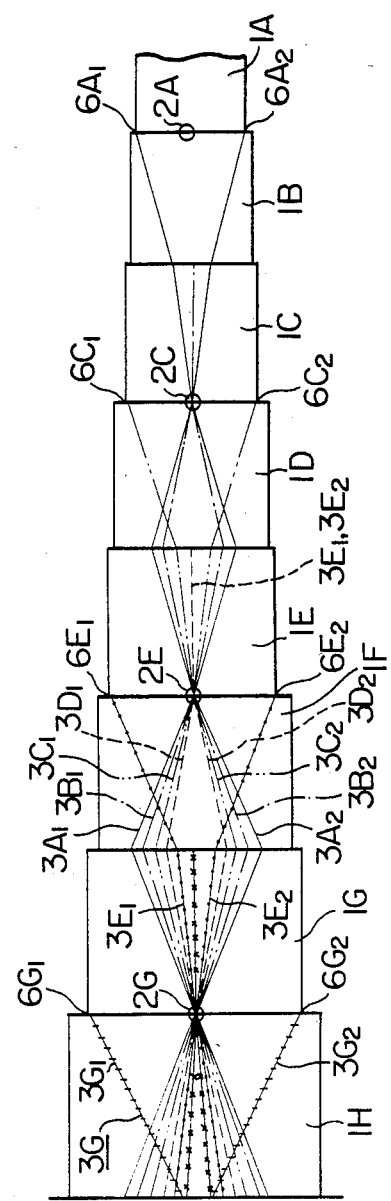

The arrangement of the wires for moving the arm sections in swinging movement will be described by referring to FIGS. 3A and 3B. FIG. 3A is a view as seen in the direction of arrows IIIA—IIIA in FIG. 1, and FIG. 3B is a view as seen in the direction of arrows IIIB—IIIB in FIG. 3A. In these figures, some wires are indicated by lines of the types different from those indicating other wires to clearly distinguish one wire from other wires. Seven wires are used to move the arms 1A-1G in swinging movement while the arm 1H remains stationary. Each wire is wound on a pulley of a pulse motor located in the fixed portion 5 and connected at opposite ends thereof to one end (the end having no projections) of the associated arm. The position in which the wire is connected to the respective arm is displaced by a circumferential extent of 90 degrees from the joint serving as a pivot for the swinging movement of the arm. Connection of the wires will be explained by referring to a wire 3C shown in FIG. 1 in which the wire 3C is wound on a pulley 4C of a pulse motor and connected at opposite ends thereof to the arm 1C. The pulley 4C is connected to the pulse motor through a speed reducing gearing, not shown. To facilitate explanation, the wire 3C will be described as being composed of a wire run $3C_1$ extending from the pulley 4C to one end of the wire 3C, and a wire run $3C_2$ extending from the pulley 4C to the other end thereof. Referring to FIGS. 3A and 3B, the wires 3A, 3B, 3D, 3E, 3F and 3G subsequently to be described shall each be described as being composed of wire runs $3A_1$, $3B_1$, $3D_1$, $3E_1$, $3F_1$ and $3G_1$ extending from the pulley to one end of the respective wire, and wire runs $3A_2$, $3B_2$, $3D_2$, $3E_2$, $3F_2$ and $3G_2$ extending from the pulley to the other end thereof, respectively, as is the case with the wire 3C. The wires 3A–3G are all located within the arms.

The wire run $3C_1$ extends through one of the guide holes 8 of the rod 7A of each of the joints 2G, 2F, 2E and 2D and is connected to the arm section 1C at a point $6C_1$, and the wire run $3C_2$ extends through one of the guide holes 8 formed at the rod 7B of each of the joints 2G, 2F and 2D and is connected to the arm section 1C at a point $6C_2$.

Other wires will be described by referring to FIGS. 3A and 3B. Although not shown, the wires 3A, 3B, 3D, and 3E–3G are each wound on a pulley of a respective pulse motor located in the fixed portion 5.

The wire run $3A_1$ extends through one of the guide holes 8 formed at the rod 7A of each of the joints 2G, 2F ... and 2B and is connected to the arm section 1A at a point $6A_1$. The wire run $3A_2$ extends through one of the guide holes 8 formed at the rod 7B of each of the joints 2G, 2F ... and 2B and is connected to the arm 1A at a point $6A_2$. The wire run $3B_1$ extends through one of the guide holes 8 formed at the rod 7A of each of the joints 2G, 2F ... 2C and is connected to the arm 1B at a point $6B_1$. The wire run $3B_2$ extends through one of the guide holes 8 formed at the rod 7B of each of the joints 2G, 2F ... and 2C and is connected to the arm 1B at a point $6B_2$. The wire run $3D_1$ extends through one of the guide holes 8 formed at the rod 7A of each of the joints 2G, 2F and 2E and is connected to the arm 1D at a point $6D_1$. The wire run $3D_2$ extends through one of the guide holes formed at the rod 7B of each of the joint 2G, 2F and 2E and is connected to the arm 1D at a point $6D_2$. The wire run $3E_1$ extends through one of the guide holes 8 formed at the rod 7A of each of the joints 2G and 2F and is connected to the arm section 1E at a point $6E_1$. The wire run $3E_2$ extends through one of the guide holes 8 formed at the rod 7B of each of the joints 2G and 2F and is connected to the arm section 1E at a point $6E_2$. The wire run $3F_1$ extends through one of the guide holes 8 formed at the rod 7A of the joint 2G and is connected to the arm section 1F at a point $6F_1$. The wire run $3F_2$ extends through one of the guide holes 8 formed at the rod 7B of the joint 2G and is connected to the arm 1F at a point $6F_2$. The wire run $3G_1$ is directly connected from the pulley to the arm section 1G at a point $6G_1$, and the wire run $3G_2$ is directly connected from the pulley to the arm section 1G at a point $6G_2$.

Each of the guide holes 8 formed at the rods 7A, 7B of the joints 2 allows only one wire, not two or more than two wires, to extend therethrough. To this end, the guide holes 8 formed at the rods 7A, 7B of the joints 2 vary in number. More specifically, the rods 7A and 7B of the joint 2G are each formed with six guide holes 8; the rods 7A ahd 7B of the joint 2F are each formed with five guide holes; the rods 7A and 7B of the joint 2E are each formed with four guide holes 8; the rods 7A and 7B of the joint 2D are each formed with three guide holes 8; the rods 7A and 7B of the joint 2C are each formed with two guide holes 8; and the rods 7A and 7B of the joint 2B are each formed with one guide hole 8. The rods 7A and 7B of the joint 2A have no guide holes.

The arrangement of the wire runs are such that the wire runs for operating the foremost arm extend through the guide holes 8 remote from the ring 10 and the guide holes 8 through which the wire runs extend are nearer to the ring 10 or the center of the joint when the arm to which the wire runs are connected becomes nearer. A pair of wire runs for operating the same arm extend through the guide holes 8 disposed symmetrically with respect to the ring 10 at the center of the joint 2. The reason why the wire runs extend through the guide holes 8 nearer to the ring 10 of the joint 2 as the arm to which the wire runs are connected becomes nearer is because this enables the range of swinging movement of the arm section to be increased. The wire runs extending between the joint for moving the arm section for up-and-down swinging movement and the joint for moving the arm section for left- and right swinging movement are trained such that, of the multiplicity of wire runs trained between the adjacent two joints located parallel to each other, those wire runs designed to operate the arm sections nearer to the forward end of the multiarticulated mechanism extend through the guide holes which are more remote from the center of the joints or are located on the outer side of the joints and those wire runs which are designed to operate the arm sections farther from the forward end of the multiarticulated mechanism extend through the guide holes nearer to the center of the joints or are located on the inner side of the joints. Thus the multiarticulated mechanism is twisted in such a manner that the adjacent joints are displaced from each other by a circumferential extent of 90 degrees.

Operation of moving the arms in swinging movement will be described. Each arm is moved in swinging movement by actuating the associated pulse motor located in the fixed position 5.

The operation will first be described by referring to the arm section 1C. Upon rotating the pulley 4C of the pulse motor in the direction of an arrow Q in FIG. 1, the wire run $3C_1$ is pulled leftwardly in FIG. 1 to shift the wire run $3C_2$ rightwardly in FIG. 1. As the wire runs $3C_1$ and $3C_2$ move as aforesaid, the arm 1C moves in swinging movement about the joint 2C in the direction of an arrow P. When it is desired to move the arm 1C in swinging movement in a direction opposite the direction of the arrow P, one only has to rotate the pulley 4C in a direction opposite the direction of the arrow Q. The angle of swinging movement of the arm 1C is detected by a position detector, not shown, connected to the pulse motor.

Other arm sections than the arm section 1C described hereinabove can be moved in swinging movement by driving the associated pulse motors and rotating the pulleys in a direction in which the arms are desired to move in swinging movement. The angle of swinging movement of each arm is detected by a position detector connected to each pulse motor. The position of the forward end of the multiarticulated manipulator can be determined by taking into consideration the distances between the joints as the angles of swinging movements of the arms detected by the respective position detectors are inputted to a computer. To avoid loosening of the wire runs, the pulleys and the pulse motors are pulled by means of tension reels and tension rods.

The most important feature of the embodiment of the multiarticulated manipulator shown in FIG. 1 is that even if one arm is moved in swinging movement about an arbitrarily selected joint, the wire runs extending between such joint and the joint adjacent thereto remain unchanged in length. For example, assume that the arm 1G is moved in up-and-down swinging movement about the joint 2G in FIG. 3B. The arm 1G will be bent at one point of the joint 2G, so that the length of the wire runs between the joint 2G and the adjacent joint 2F remains unchanged. This would mean that when an arm connected to a certain joint is moved, in swinging movement, no interference phenomenon would occur or the swinging movement of the arm would not cause other arms to move in swinging movement about other joints. In the embodiment shown and described hereinabove, the arrangement that the guide holes 8 are formed at the rods 7A and 7B of the joints has the effect of avoiding the occurrence of the interference phenomenon. Thus, it is possible to obtain accurate information on the position of the forward end of the multiarticulated manipulator when an arbitrarily selected arm is moved in swinging movement.

The embodiment shown and described hereinabove offers the advantage that the multiarticulated manipulator can be bent as desired in three dimensions.

The multiarticulated manipulator constructed as aforesaid can be used for various purposes, including inspection and handling of articles. When it is desired to grip an object by means of the multiarticulated manipulator, one only has to attach a handling portion to the forward end of the arm 1A and connect wires and other means for effecting opening and closing of the handling portion by remote control to the fixed portion 5 through an opening 10A of the ring 10 shown in FIG. 2.

FIGS. 4–7 show an example of the multiarticulated manipulator according to the invention as being incorporated in a movable type remote-controlled visual monitor system mounted in a container of a nuclear reactor.

Figure 4:
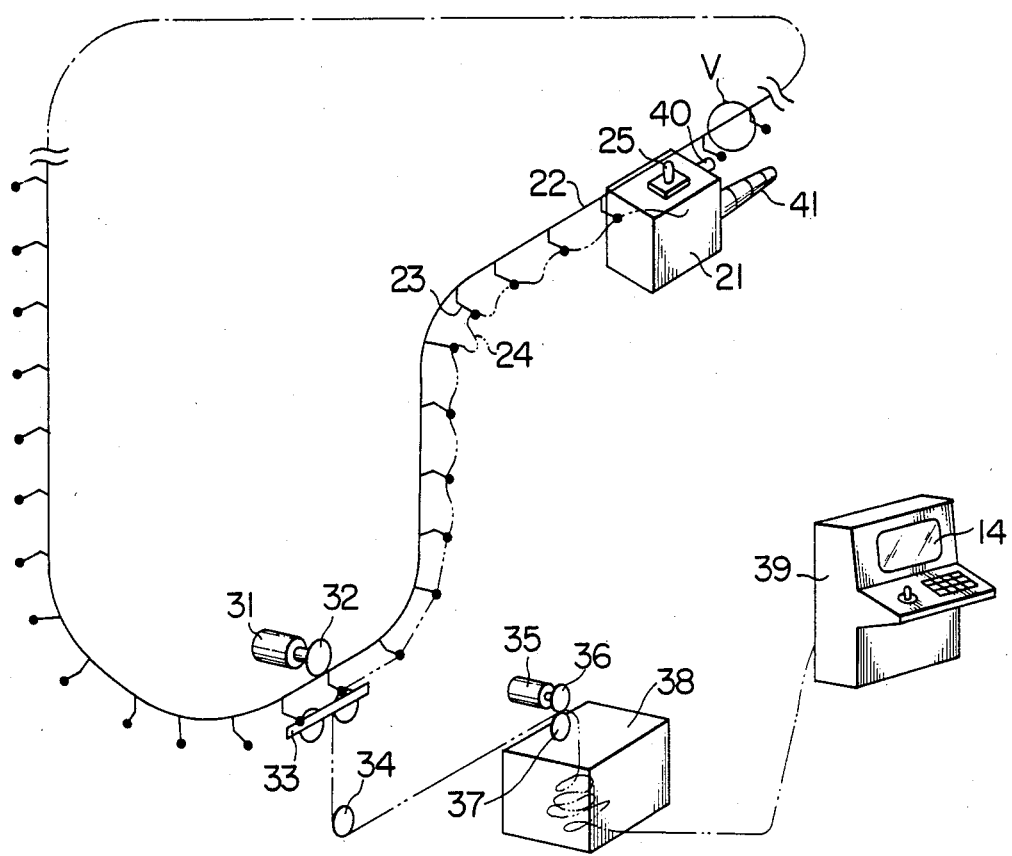
FIG. 4 is a view showing the construction of a movable remote-controlled monitor system mounted inside a preliminary containment vessel of a nuclear reactor in which the multiarticulated manipulator shown in FIG. 1 is incorporated.
Figure 5:
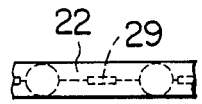
FIG. 5 is a view, on an enlarged scale, of the portion V shown in FIG. 4.

FIG. 4 schematically shows a movable type visual monitor system incorporating therein the multiarticulated manipulator according to the invention. As shown, the system comprises a movable member 21 suspended through a hanger 25 from a trolley chain 29 (see FIG. 5) mounted at a guide rail 22 in the form of a pouch slitted at its bottom in cross section, so that the movable member 21 can move along the guide rail 22 which is located in the container of the nuclear reactor. The trolley chain 29 mounted at the guide rail 22 is in meshing engagement with a sprocket wheel 32 of a chain drive mechanism 31. The trolley chain 29 is endless as is the guide rail 22 at which it is mounted. The moving member 21 travels along the guide rail 22 of the endless type as the trolley chain 29 is moved by the chain drive mechanism 31. However, since the moving member 21 pulls a cable 24, it is required to return to the starting point by moving in a reverse direction after making a round of the guide rail 22 and unable to make several rounds in the same direction. The trolley chain 29 has projections located equidistantly from one another and extending in the same direction through the slit at the bottom of the guide rail 22. A cable clamp 23 is bolted to each one of the projections. The cable 24 connected to the movable member 21 is payed out of a cable tank 38 as the movable member 21 travels along the guide rail 22 and successively connected by a clamping mechanism 33 to the cable clamps 23 which are secured to the trolley chain 29, so that the cable 24 moves in the same direction as the movable member 21 at the same speed. When the movable member 21 moves rearwardly, the cable 24 is successively disconnected from the cable clamps 23 and returned to the cable tank 38 by following the aforesaid process in reverse. A motor 35 is actuated when it is desired to pay the cable 24 out of the cable tank 38 and return same thereto. Actuation of the motor 35 allows the cable 24 to move between a pulley 36 connected to the motor 35 and a pulley 37 located in juxtaposed relation to the pulley 36. 34 is a guide reel for the cable 24. The cable 24 extends from the cable tank 38 to a control panel 39 having a monitoring television receiver and operation buttons.

Figure 6:
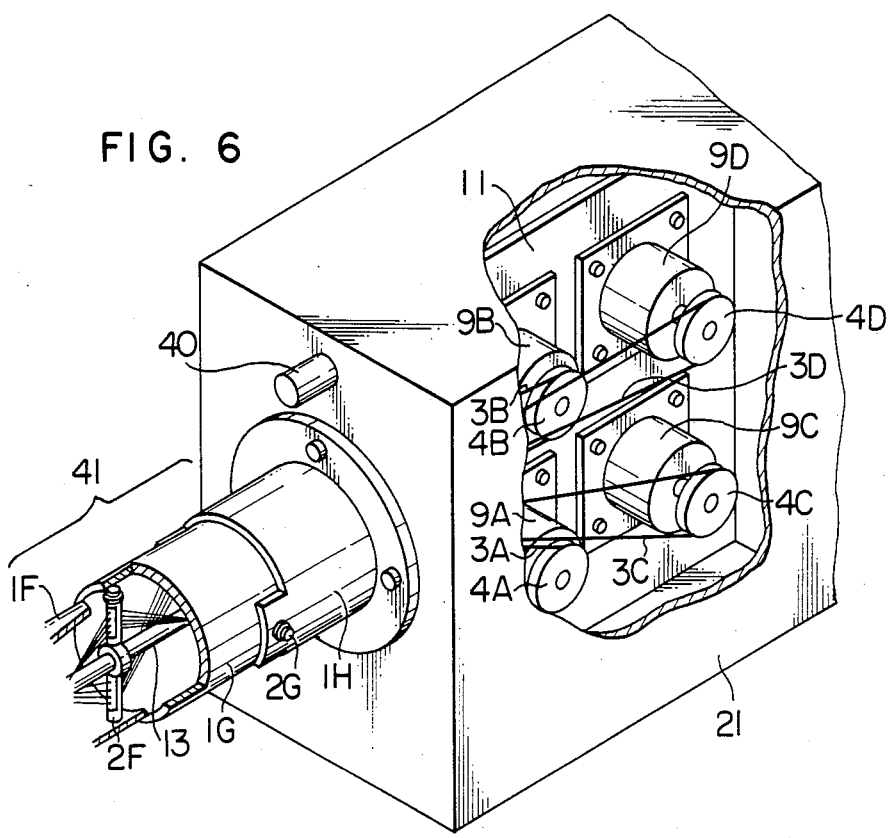
FIGS. 6 and 7 are perspective views, with certain parts being cut out, of the multiarticulated manipulator shown in FIG. 4.
Figure 7:
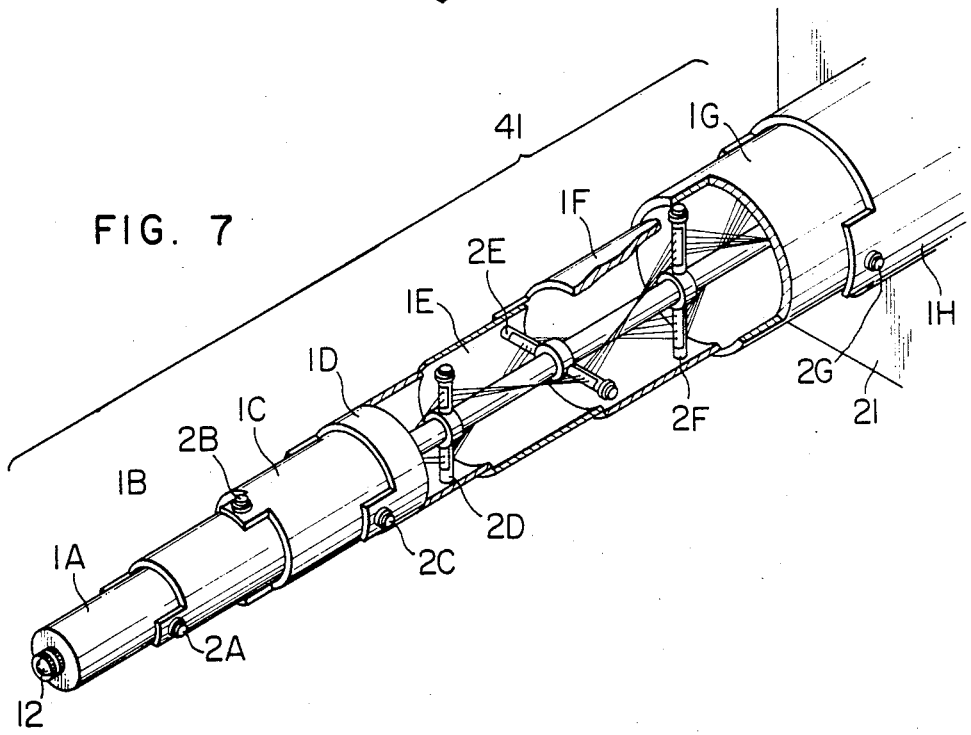

A television camera 40 and the multiarticulated manipulator 41 shown in FIG. 1 are located anterior to the movable member 21. The construction of the multiarticulated manipulator 41 will be described by referring to FIGS. 6 and 7 in which parts similar to those shown in FIG. 1 are designated by like reference characters. As shown in FIG. 6, a multiplicity of pulse motors corresponding in number to the joints 2 are mounted in the movable member 21. FIG. 6 shows the pulse motors 9A, 9B, 9C and 9D for operating the joints 2A, 2B, 2C and 2D respectively which are supported on a support plate 11 in the movable member 21. Although not shown, the pulse motors for operating the joints 2E, 2F and 2G are supported on another support plate located in juxtaposed relation to the support plate 11 in the movable member 21. The pulse motors 9A, 9B, 9C and 9D are connected to pulleys 4A, 4B, 4C and 4D respectively through speed reducing gearings, not shown. Although not shown, other pulse motors are also provided with respective pulleys. As shown in FIGS. 3A and 3B, six wires 3A–3G connected at opposite ends to the joints 2A–2G are connected to the respective pulleys. Of these six wires 6A–6G, the wires 3A, 3B, 3C and 3D are shown in FIG. 6. The multiarticulated manipulator 41 shown in FIG. 7 is of the same construction as the multiarticulated manipulator shown in FIG. 1 and its connection is shown in three dimensions. The arrangement of the wires and the manner in which the wires are connected to the arm sections in the multiarticulated manipulator 41 are similar to those in the multiarticulated manipulator shown in FIGS. 3A and 3B. Like the pulse motors of the multiarticulated manipulator shown in FIG. 1, the pulse motors of the multiarticulated manipulator 41 are each provided with a position detector, a tension reel and a tension rod.

Located at the forward end of the multiarticulated manipulator 41 is a lens 12 connected to a fiberscope 13 which extends through the openings 10a of the rings 10 of the joints 2A–2G to the movable member 21 to be connected to a television camera, not shown, mounted in the movable member 21 which is distinct from the television camera 40. The television camera 40 and the television camera connected to the fiberscope 13 produce video signals which are transmitted through the cable 24 to the control panel 39 and converted to visual images by the monitor television receiver 14 of the control panel 39.

The chain drive mechanism 31 is actuated through the control panel 39 to cause the trolley chain 29 to move to allow the movable member 21 to travel along the guide rail 22. The television camera 40 converts visual images located ahead of the movable member 21 in a direction in which it moves to video signals. The operator can determine the position of the movable member 21 by converting the video signals to visual images which are shown on the monitoring television receiver 14.

Operation of the multiarticulated manipulator 41 is performed by control signals transmitted from the control panel 39 to the movable member 21 through the cable 24. More specifically, a drive signal is supplied from the control panel 39 to the pulse motor which drives the wire for operating the arm section desired to be moved in swinging movement. The pulse motor in the movable member 21 begins to rotate upon receipt of the drive signal. Rotation of the pulse motor causes the wire to move so as to thereby move the arm section in swinging movement about the joint. The swinging movement of each of the arms of the multiarticulated manipulator 41 occurs in the same manner as described by referring to the swinging movement of each arm of the multiarticulated manipulator shown in FIG. 1. By moving the multiplicity of arm sections in swinging movement, it is possible to cause the forward end (the end at which the lens 12 is connected) of the multiarticulated manipulator 41 to move to any position as desired, such as a position behind pipings or equipment or in the bore of the piping or inside the equipment, which is beyond the range of visual observation of the television camera 40. Thus the multiarticulated manipulator 41 is able to produce visual images of portions which the television camera 40 has been unable to, even if it is of a pivotable type. Visual images are transmitted from the lens 12 to the television camera in the movable member 21 through the fiberscope 13, thereby facilitating monitoring of portions behind and between the pipings. The camera 40 has the function of enabling the movements of the multiarticulated manipulator 41 to be obtained as visual images and monitoring them. Although not shown, an illuminating lamp to aid in taking pictures is attached to the forward end of the multiarticulated manipulator 41.

The multiarticulated manipulator 41 may be equipped with a thermometer, a vibrator and a radiation counter, in addition to the lens 12 and fiberscope 13.

When the multiarticulated manipulator 41 according to the invention is incorporated in a movable type visual monitor system, it is possible to perform inspection of positions behind pipings or equipment in a container of a nuclear reactor of high radioactivity level which lie beyond the range of visual observation with the television camera 40, thereby increasing the area of the zone in which monitoring can be achieved by visual means. The end can be attained without laying the guide rail 22 in complicated zigzag fashion. As described hereinabove, the provision of the guide holes 8 for passing the wires therethrough at the rods 7A and 7B of the joints 2 renders the length of the wire runs constant between the arbitrarily selected adjacent two joints even if one arm is moved in swinging movement about one of such joints. Stated differently, no interference phenomenon occurs when an arm connected to one junction is moved in swinging movement, so that the swinging movement of such arm does not cause other arms connected to other joints to move in swinging movement. This enables the position of the forward end of the multiarticulated manipulator 41 to be determined with a high degree of accuracy when arbitrarily selected arms are moved in swinging movement. This characteristic makes the multiarticulated manipulator 41 very advantageous for use with a remote-controlled visual monitor system in which it is essential to correctly determine the position in which inspection is being performed. In the event that any abnormal condition exists in the piping, for example, it is possible to determine the location of the flaw accurately and carry out repair readily.

Figure 8:
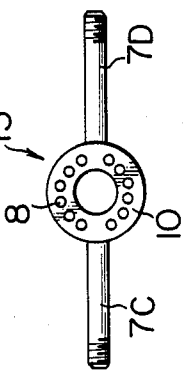
FIG. 8 is a view showing the construction of a modification of the joints used with the multiarticulated manipulator according to the invention.

FIG. 8 shows a modification of the joints of the multiarticulated manipulator according to the invention. As shown, the joint 15 is formed with the guide holes 8 at the ring 10, not at the rods 7A and 7B as in the embodiment shown in FIG. 2, and rods 7C and 7D with no guide holes are connected to the ring 10 with the guide holes 8. The wires for operating the arms of the multiarticulated manipulator each extend through one of the guide holes 8 of the joint 15. The multiarticulated manipulator having the joints 15 can also be bent readily in three dimensions. However, in the multiarticulated manipulator provided with the joints 15, when an arm connected to an arbitrarily selected joint is moved in swinging movement, the arms adjacent such arm might be caused to move slightly by the interference phenomenon about the joints to which they are connected. Thus the accuracy with which the position of the forward end of the multiarticulated manipulator might slightly be reduced.

From the foregoing description, it will be appreciated that the multiarticulated manipulator according to the invention can be bent readily in three dimensions and lends itself to use with a remote-controlled visual monitor system.

What is claimed is:

1. A multiarticulated manipulator comprising:
   a multijoint connecting mechanism including a plurality of arms, each arm having a joint capable of being bent in only one plane about a joint axis and all the arms being connected with one another in positions displaced from one another by a circumferential extent of an arbitrarily selected angle;
   a multiplicity of wires each connected to one of the arms for moving the arms in swinging movement about the joint axis of their respective joints;
   a plurality of wire guides for supporting and guiding the wires through the arms of said multijoint connecting mechanism to their arms to be moved in swinging movement, each of said wire guides being formed with apertures located on the joint axis of a respective one of the joints for the wires to extend therethrough, so that, when one arm is actuated for swinging movement about its joint axis by driving the wires connected thereto, no mutual interference occurs between the joints during operation whereby the swinging movement of the arm about its joint axis does not cause other arms to move in swinging movement about their joint axes; and
   drive unit means for driving each of the wires.

2. A multiarticulated manipulator as claimed in claim 1, wherein each said arm is displaced from the adjacent arm by 90 degrees.

3. A multiarticulated manipulator as claimed in claim 1, further comprising operating means located at a forward end of said multijoint connecting mechanism, and an operating mechanism for actuating said operating means, said operating mechanism extending through openings formed in central portions of members of said wire guide means.

4. A multiarticulated manipulator as claimed in claim 1, wherein each said joint comprises a pair of rods opposed to each other, and a ring interposed between the pair of rods, said rods constituting said wire guides for supporting and guiding said wires.

5. A movable visual monitor system comprising:

a multijoint connecting mechanism including a plurality of arms, each arm having a joint capable of being bent in only one plane about a joint axis and all the arms being connected with one another in positions displaced from one another by 90 degrees;

a plurality of wires each connected to one of said arms for moving the arms in swinging movement about the joint axis of their respective joints;

drive unit means for selectively driving said wires;

a lens fixed to a forward end of said multijoint connecting mechanism;

a fiberscope connected to said lens;

a movable member having said drive unit means mounted therein and supporting said multijoint connecting mechanism; and a camera mounted in said movable member and connected to said lens through said fiberscope;

wherein each said joint comprises a pair of rods opposed to each other and located in the joint axis of said joint, and a ring located between said rods in a central portion of each joint, said rods being formed with guide holes located on the joint axis for supporting and guiding the wires and said ring being formed with an opening for the fiberscope to extend therethrough whereby the swinging movement of one arm about its joint caused by driving the wires connected thereto does not cause other arms to move in swinging movement about their joint axes.

* * * * *